United States Patent Office 3,793,371
Patented Feb. 19, 1974

3,793,371
METHOD FOR THE PREPARATION OF PYROMELLITIC ACID
Kiyoshi Takagi, Hiroshi Miyamori, Tomiya Isshiki, Tetsuo Tomita, and Harushige Ohki, Tokyo, Japan, assignors to Mitsubishi Gas Chemical Company, Inc., Tokyo, Japan
No Drawing. Continuation-in-part of abandoned application Ser. No. 703,269, Feb. 6, 1968. This application June 16, 1971, Ser. No. 153,803
Claims priority, application Japan, Feb. 24, 1967, 42/11,489
Int. Cl. C07c 63/02
U.S. Cl. 260—524 R      18 Claims

ABSTRACT OF THE DISCLOSURE

A method of catalytically oxidizing a 1,2,4,5- substituted benzene having at least one chloromethyl substituent in the presence of a $V_2O_5$ containing catalyst at a temperature of 360–650° C., by introducing a molecular oxygen containing gas in which the oxygen quantity employed is 2–50 times as high as that of the stoichiometrical amount, at a space velocity of 1,000–100,000, to prepare pyromellitic acid, wherein a minor proportion of 1,2,3,4- or 1,2,4,6- substituted benzenes with at least one chloromethyl group increases yields.

---

This application is a continuation-in-part of U.S. Ser. No. 703,269 filed Feb. 6, 1968, now abandoned, claiming the priority of Japenese patent application No. 42–11,489, filed Feb. 24, 1967.

BACKGROUND OF THE INVENTION

Field of the invention

The present invention relates to a method for the preparation of pyromellitic acid by the oxidation of 1,2,4,5-substituted benzenes having at least one chloromethyl substituent in the gaseous phase with molecular oxygen at a temperature of 360–650° C. to convert the substituents into carboxyl groups.

One object of this invention is to obtain pyromellitic acid at a good efficiency, i.e., at high yields.

Description of the prior art

In the preparation of pyromellitic acid, a method is known which comprises the catalytic oxidation of 1,2,4,5-tetramethylbenzene in the gaseous phase. The method is, however, defective in that the tetramethylbenzene raw material is not only high priced but is also placed under restrictions in respect to the amount of supply.

There is also known another method which comprises preparing the corresponding methoxymethyl groups by treating the chloromethyl groups of dichloromethylxylene (which is easily available) with caustic soda and an excess of methanol, and thereafter oxidizing the dimethoxyfethylxylene with nitric acid under pressure to yield pyromellitic acid. However, this method is also of little industrial advantage in that it requires facilities for recovering nitric acid as well as pressure vessels, and involves many complicated operations.

As to the synthesis of pyromellitic acid by the gas phase catalytic oxidation of 1,2,4,5- substituted benzenes having a chloromethyl group as a substituent, it is proposed in the specification of Austrian Pat. No. 169,330 to carry out the synthesis at a temperature of 310–320° C. In the description of this reference no concrete description regarding the conditions of reaction, confirmation of product, etc., is given, and the yield attained is about 39%. No further work has been done since the issue of the above Austrian patent on the process described therein. However, the present inventors have observed in experiments they carried out at temperatures of about 310–320° C. (as described in referential examples prior to Example 8 set out below) that reaction proceeded very slowly, and the rate of conversion to pyromellitic acid, and the yield and purity of the product are correspondingly very low. The inventors concluded that the method of Austrian 169,330 is not industrially valuable.

SUMMARY OF THE INVENTION

With the purpose of overcoming the disadvantages mentioned above, the present inventors made a study of the synthesis of pyromellitic acid by the gas phase catalytic oxidation of chloromethyl-substituted benzene, and as a result have arrived at the discovery that not only does the reaction temperature have a great influence on the yield of the product, but that by using a mixture of a 1,2,4,5- substituted benzene and a minor amount of a 1,2,3,4- and/or 1,2,4,6- substituted benzene, superior results (higher yields) are obtained. At least one of substituents on the 1,2,4,5- 1,2,3,4- and/or 1,2,4,6-substituted benzene must be a chloromethyl group, and the remaining substituents are alkyl, alkoxymethyl and combinations thereof. By selecting a suitable ratio of air/raw material and a space velocity, etc. the chloromethyl group hitherto regarded as unstable and liable to decompose and polymerize, and consequently hitherto viewed as difficult to smoothly oxidize into carboxyl groups can be oxidized with high efficiency and high yields.

DETAILED DESCRIPTION OF THE PREFERRED EMBODIMENTS

As 1,2,4,5- substituted benzenes useful in the method of the present invention there are, for example, dichloromethylxylene, monochloromethyl-trimethylbenzene, trichloromethyltoluene, tetrachloromethylbenzene and derivatives thereof having an alkoxymethyl group and/or other alkyl group such as ethyl or propyl group. Regarding alkyl groups in alkoxy groups, a wide range of alkyls can be taken but lower alkyl groups such as $C_1$–$C_4$ alkyls are preferable, and $C_1$ and $C_2$ alkyls among these are the most common.

The 1,2,4,5- substituted benzenes used may consist of a single chemical species or a mixture of two or more members of the corresponding species.

The preferred 1,2,4,5- substituted benzenes for use in the invention are substituted with one or two chloromethyl groups, and most preferably one chloromethyl group is at the 5- position. However, it shall be understood that from 1 to 4 chloromethyl groups can be present at any time of 1 to 4 chloromethyl groups can be present at any of stituted groups (alkyl and/or alkoxy methyl, preferably methyl, ethyl or propyl or ($C_1$–$C_4$ alkyl) oxymethyl), filling the remaining positions.

The same analysis holds true for the 1,2,3,4- or 1,2,4,6- compounds, where most preferably one of the, or the sole, chloromethyl group occurs at the 3- or 6- positions, though such is not mandatory.

Surprisingly, it has been found that the yield of pyromellitic acid can be improved when tetraalkylbenzene or derivatives thereof substituted with at least one chloromethyl group, where the remaining groups are alkyl groups or combination, are added to the 1,2,4,5- substituted benzene containing a chloromethyl group. As for specific tetra- substituted benzenes having a chloromethyl group used for this function, there can be mentioned 1,2,3,4- and 1,2,4,6- substituted benzenes.

As the catalyst applicable to the method of the present invention, on the other hand, there can generally be mentioned oxides of polyvalent metals, $V_2O_5$ being particularly effectively employed either singularly or in the form of a mixture containing oxides of Mo, Sn, Ag, Ce, W, Zn, Cd, Co or Ti, with Mo and Sn being preferred.

These catalysts may be fixed on suitable carriers by conventional calcination or sintering.

Oxides of alkali metals such as $K_2O$, $Na_2O$ or salts thereof such as $K_2SO_4$ or phosphorus compounds such as $P_2O_5$ may also be added as catalyst promoters.

In employing these catalysts, they can be in the state of mixture or in multilayers, as the occasion demands.

Aromatic hydrocarbons such as toluene, xylene, trimethylbenzene, etc., aliphatic hydrocarbons, or aromatic and aliphatic halogenated hydrocarbons may be mixed with the substituted benzene as the raw material, if desired. Aromatic hydrocarbons, such as ortho-xylene, may be present in amounts of up to 50% by mole and other hydrocarbons up to 30% by mole.

As the source of molecular oxygen, air is suitable. There may be mixed therewith, if desired, $N_2$, hydrogen halides or gas generated during the oxidation as a diluent.

As to the relative amounts of the air to the substituted benzene used as the raw material, it is suitable that the former amounts to 2–50 times, preferably 10–20 times the amount theoretically required to oxidize the latter into carboxylic acid.

In the case of Example 1, the molar ratio of air/raw material is 393 and the oxygen/raw material ratio is calculated to be 393/5=78.6. Accordingly the employed ratio/theoretical ratio is 78.6/5, that is, the employed amount of oxygen is 15.7 times the theoretical amount of oxygen.

The reaction temperature is 360–650° C., preferably 360–500° C.

The space velocity of reaction gas calculated at the normal state is 1,000–100,000, preferably 5,000–20,000 hr.$^{-1}$ $$\left(\frac{\text{Gas volume at STP in } 1/\text{hr.}}{\text{Catalyst Volume}}\right)$$

Hereafter all space velocities are in hr.$^{-1}$.

The pyromellitic acid thus produced can be easily collected by separating it from the oxidation products in accordance with the conventional after treatment of a gas phase oxidation as, for instance, in obtaining phthalic anhydride.

According to the method of the present invention, pyromellitic acid can be produced with good yields at high efficiency to advantage industrial.

In the following, the method of the present invention will be concretely explained by way of several examples which are not be taken as limiting the scope of the invention.

REFERENTIAL EXAMPLE 1

A Pyrex glass reaction tube set in a metal bath was filled up with a $V_2O_5$-alumina catalyst containing about 10% by weight of $V_2O_5$ which had been prepared by steeping globular alumina as the carrier in an aqueous solution of $NH_4VO_3$, evaporating the water under stirring, and calcining the residual solid at 500° C. for 4 hours in an electric furnace while passing therethrough air. In this reaction tube 1,5-dimethyl-2,4-dichloromethyl benzene (4,6-dichloromethyl-m-xylene) was oxidized according to conventional gas phase catalytic oxidation practices under the following conditions: the reaction temperature was 310–315° C.; space velocity of the reaction gas was 9,000; and the molar ratio of air/raw material was 420.

After collecting, the product was dissolved in acetone and the acetone distilled off. Water-soluble matters were then separated from the residue, thoroughly dried and subjected in a known manner to acid value determination and gas-chromatographic analysis.

The product of the experiment consisted almost entirely of unchanged raw material and contained only a very small quantity of water-soluble reaction product, the formation of pyromellitic acid being thus scarcely recognized.

REFERENTIAL EXAMPLE 2

A catalyst was prepared in the same way as in Referential Example 1 except that the carrier on which about 10% by weight of $V_2O_5$ was fixed by calcination consisted of 6–8 mesh size aluminum-vanadium alloy (vanadium content: 4%). In the presence of this catalyst 395 parts of 1,5-dimethyl-2,4-dichloromethyl benzene was oxidized following the process of Referential Example 1 under the following conditions: the reaction temperature was 315–320° C., the space velocity of reaction gas was 4900 hr.$^{-1}$ and the molar ratio of air/raw material was 330.

Following the after-treatment procedure described in Referential Example 1, 20.5 parts of pyromellitic acid (acid valve: 741) was obtained. According to the result of gas-chromatographic analysis, the pyromellitic acid was of a purity of 55%, i.e. the yield of pyromellitic acid based on raw material was only 5.5% of the theoretical amount.

EXAMPLE 1

Using the catalyst of Referential Example 1 and following the same process as in Referential Example 1, 1,5-dimethyl-2,4-dichloromethyl benzene (4,6-dichloromethyl-m-xylene) was oxidized at a reaction temperature of 410–420° C., a space velocity of 8900 and a molar ratio of air/raw material of 393. By after-treating the product in the same way as in Referential Example 1, there was obtained from 821 parts of raw material 606 parts of pyromellitic acid having an acid value of 850, the yield being 51% of the theoretical amount.

EXAMPLE 2

Using a catalyst fixed by fusion on the carrier described in Referential Example 1 and following the process of Referential Example 1, 1,4-dimethyl-2,5-dichloromethyl benzene (2,5-dichloromethyl-p-xylene) was oxidized at a reaction temperature of 472–482° C., a space velocity of 8,700 and a molar ratio of air/raw material of 560. By after-treating the product as in Referential Example 1, there was obtained from 848 parts of raw material 731 parts of pyromellitic acid having an acid value of 857.

The yield of pyromellitic acid was 61% of the theoretical.

EXAMPLE 3

Following the process of Referential Example 1 but by using a $V_2O_5$-$MoO_3$ catalyst supported on the carrier described in Referential Example 1 so as to provide a $V_2O_5$/$MoO_3$ molar ratio of 1/0.11, 1,5-dimethyl-2,4-dichloromethyl benzene (4,6-dichloromethyl-m-xylene) was oxidized at a reaction temperature of 420–430° C., a space velocity of 9,000 and an air/raw material ratio of 350.

After-treatment carried out as in Referential Example 1 yielded, from 705 parts of raw material consumed, 614 parts of pyromellitic acid having an acid value of 840.

The yield of pyromellitic acid was 63% of the theoretical.

EXAMPLE 4

Using a $V_2O_5$-$P_2O_5$ catalyst fixed by calcination onto the same carrier as in Referential Example 1 to provide a $V_2O_5$/$P_2O_5$ molar ratio of 1/0.133, 883 parts of 1,5-dimethyl-2,4-dichloromethyl benzene (4,6-dichloromethyl-m-xylene) was oxidized at a reaction temperature of 410–420° C., a space velocity of 9,000 and an air/raw material ratio of 420.

By after-treating the product as in Referential Example 1,559 parts of pyromellitic acid having an acid value of 807 was obtained, the yield being 41% of the theoretical.

EXAMPLE 5

Using the catalyst of Example 3 and following the process of Referential Example 1, a mixture comprising 70% by weight of 1,5-dimethyl-2,4-dichloromethyl benzene (4,6-dichloromethyl-m-xylene), 30% by weight of 2,4-dichloromethyl-m-xylene and small quantities of xylenes and monochloromethyl xylenes (dichloromethylated substances=1116 parts) was oxidized under the following conditions: reaction temperature 420–430° C., space velocity 9,000 hr.$^{-1}$ and an air/raw material molar ratio of 330.

By after-treating the product as in Referential Example 1, 783 parts of pyromellitic acid having an acid value of 859 was obtained.

The yield of pyromellitic acid was as high as 70% of the theoretical amount based on 1,2,4,5- substituted benzene.

EXAMPLE 6

Using the catalyst of Referential Example 2 and operating under the conditions as in Referential Example 1, 781 parts of 1,4-dimethyl-2,5-dichloromethyl benzene (2,5-dichloromethyl-p-xylene) was oxidized under the following conditions: reaction temperature of 410–420° C., space velocity of 9,800 and an air/raw material molar ratio of 339.

By after-treating the product as in Referential Example 1, there was obtained 581 parts of pyromellitic acid having an acid value of 876, the yield being 59.4% of the theoretical amount.

EXAMPLE 9A

Comparative run: Following the procedure of Referential Example 1, 1,5-dimethyl-2,4 dichloromethyl benzene was oxidized over $V_2O_5$ on $Al_2O_3$ at a space velocity of 10,400/hour, a molar ratio of air to the benzene of 470 and a temperature of 415–425° C. The yield of pyromelletic acid was 61% of theoretical based on the moles of the 1,2,4,5-benzene.

Run in accordance with the invention: At substantially the exact conditions as in the comparative run, a mixture of 75% 1,5-dimethyl-2,4-dichloromethyl benzene and 25% 1,3-dimethyl-2,4-dichloromethyl benzene was reacted to provide a pyromellitic acid yield of 79% of theoretical (based on the 1,2,4,5-substituted benzene). The only variation was an air: benzene molar ratio of 468 (versus 470) and a temperature of 418–425. These variations are insubstantial or to have no significant effect on the validity of the 18% increase in yield encountered upon the use of a 1,2,4,5/1,2,3,4 benzene mixture in accordance with the present invention.

EXAMPLES 9, 10 AND 11

The procedure of Referential Example 1 was followed. The basic reaction parameters are set out below, indicating changes from Referential Example 1.

| Raw material | Catalyst | Space velocity hr.$^{-1}$ | Molar ratio air/raw material | Reaction temp. (° C.) | Yield [1] (percent) |
|---|---|---|---|---|---|
| Example 9: | | | | | |
| Comparative run..... 1,4-dimethyl-2,5-dichloromethyl benzene | $V_2O_5$-$MoO_3$ ($Al_2O_3$) | 10,300 | 325 | 415–430 | 62 |
| Inventiv run..... Mixture of 83%[2] 1,4-dimethyl-2,5-dichloromethyl benzene, 10% 1,4-dimethyl-2,3-dichloromethyl benzene and 7% 1,2,4- trimethyl-3-monochloromethyl benzene. | $V_2O_5$-$MoO_3$ ($Al_2O_3$) | 10,300 | 330 | 415–430 | 74 |
| Example 10: | | | | | |
| Comparative run..... 1,2,4-trimethyl-5-monochloromethyl benzene | $V_2O_5$-$MoO_3$ ($Al_2O_3$) | 12,000 | 450 | 420–430 | 62 |
| Inventive run..... Mixture of 90% 1,2,4-trimethyl-5-monochloromethyl benzene and 10% 1,2,4-trimethyl-3-monochloromethyl benzene. | $V_2O_5$-$MoO_3$ ($Al_2O_3$) | 12,000 | 450 | 420–430 | 70 |
| Example 11: | | | | | |
| Comparative run..... 1,2,4-trimethyl-5-monochloromethyl benzene | $V_2O_5$-$SnO_2$ ($Al_2O_3$) | 11,000 | 500 | 420–430 | 60 |
| Inventive run..... Mixture of 90% 1,2,4-trimethyl-5-monochloromethyl benzene and 10% 1,2,4-trimethyl-6-monochloromethyl benzene. | $V_2O_5$-$SnO_2$ ($Al_2O_3$) | 11,000 | 500 | 420–430 | 68 |

[1] Based on 1,2,4,5- substituted benzenes.
[2] All percent are molar.

EXAMPLE 7

Using the catalyst of Example 2 and following the process of Referential Example 1, 1013 parts of 1,2,4-trimethyl-5-monochloromethyl benzene (monochloromethyl pseudocumene) was oxidized under the following conditions: reaction temperature was 470–480° C., space velocity of the reaction gas was 7,800 and the molar ratio of air/raw material was 350.

By after-treating the reaction product as in Referential Example 1, 931 parts of pyromellitic acid was obtained which had an acid value of 850.

The yield of pyromellitic acid was 55% of the theoretical.

EXAMPLE 8

Using the catalyst of Example 1 and following the process of Referential Example 2, 242 parts of a mixture of dichloromethyl-m-xylenes comprising 75% of 1,5-dimethyl-2,4-dichloromethyl benzene (4,6-dichloromethyl-m-xylene) and 25% of 2,4-dichloromethyl-m-xylene was oxidized catalytically under the following conditions: space velocity of 10,400 hr.$^{-1}$, an air/raw material molar ratio of 468 and a reaction temperature of 418–421° C. By after-treating the product as in Referential Example 1, there was obtained 194 parts of pyromellitic acid having an acid value of 830, the yield being 79% of the theoretical.

The following examples and comparative examples were run to establish the superiority of the novel system of the present invention. The basic procedure of Referential Example 1 was followed. The parameters of the following examples which differ therefrom are, of course, set out in the following examples.

Molar ratio air/raw material of 325 and 330° C. in Example 9 are substantially identical and have no significant effect upon the showing of superior results evidenced by the data.

The catalyst used in Example 9A contained about 10% by weight $V_2O_5$ based on alumina prepared as in Referential Example 1. The catalyst of Examples 9 and 10 contained 85% by weight $V_2O_5$ and 15% $MoO_3$, based on alumina, prepared by dissolving $NH_4VO_3$ and ammonium paramolybdate in an oxalic acid-water solultion, adding the alumina, evaporating, drying and calcining at 500° C. for three hours. The catalyst of Example 11 contained 85% by weight $V_2O_5$ and 15% by weight $SnO_2$, based on alumina and was prepared in the same way as in Examples 9 and 10 except that $SnCl_4$ was employed instead of ammonium paramolybdate. The catalysts were oxidized preliminarily for three hours before carrying out of the reaction.

The method preparation of the catalyst for Example 11 is as follows;

10.93 g. of $NH_4VO_3$ and 2.58 g. of $SnCl_4$ were dissolved in the solution of oxalic acid 20 g. and water 180 ml. To the solutions 100 g. of alundum (or alumina) were added and then the mixture was evaporated to complete dryness. The supported catalyst produced was calcined for 3 hours at 450° C. to 550° C.

The catalyst thus prepared is subject to preliminary oxidation for 3 hours before carrying out of the reaction. The catalysts themselves have been used for the oxidation of dimethyl benzene to phthalic acid or tetramethyl benzene to pyromellitic acid.

Reference to any of the inventive runs of Examples 9A to 11 and comparison to the comparative runs establishes that the use of mixtures of 1,2,3,4 or 1,2,4,6 substituted benzenes with 1,2,4,5 benzenes offers superior results. Within any one example, the only factor which was varied to have any effect of substance to alter the probative weight of the data was changing from a 1,2,4,5 substituted benzene to a mixture thereof with a 1,2,3,4 or 1,2,4,6 substituted benzene.

As the above data makes clear, the inventive concept here presented is predicated, inter alia, upon the use of mixtures of certain substituted benzenes to improve yields of pyromellitic acid. The invention is not to be construed as a limited one, in view of the above enabling examples. However, certain preferred embodiments do exist. For instance, to obtain the maximum benefits of the invention, preferably the 1,2,3,4- or 1,2,4,6- substituted benzenes comprise from 0.1 to 45, most preferably 2 to 35, molar percent of the total 1,2,3,4-, 1,2,4,6- and 1,2,4,5- substituted benzenes present. Further, preferred catalyst systems exist. Most preferably the catalyst comprises (catalytic oxide components) from 50 to 95 weight percent $V_2O_5$ and from 5 to 50 weight percent of another metal oxide with preferred metal oxides being heretofore defined. The amount of $V_2O_5$ on the support preferably comprises 3 to 20 weight percent, most preferably 5 to 15 weight percent, of the support. These values are non-limiting, and higher and lower amounts can be used as will be understood by one skilled in the art. It is preferred, but not mandatory for operation, that from 0.08 to 2.0 liters, especially 0.2 to 0.6 liters, of the gaseous 1,2,4,5 compound are contacted with 20 ml. of the catalyst (metal oxides and support) per hour.

What is claimed is:

1. A process for the preparation of pyromellitic acid by the catalytic oxidation of a 1,2,4,5- substituted benzene in the presence of a minor amount of a tetra-substituted benzene selected from the group consisting of 1,2,3,4- substituted benzene, 1,2,4,6- substituted benzene and mixtures thereof wherein at least one of the substituents of each of said 1,2,4,5-, 1,2,3,4- and 1,2,4,6- substituted benzenes is a chloromethyl group and wherein the remaining substitutents are selected from the group consisting of alkyl, alkoxymethyl and combinations thereof, which process comprises contacting said substituted benzene with a molecular oxygen containing gas in the presence of a vanadium oxide containing catalyst at a temperature of between 360° C. to 650° C.

2. The process of claim 1 where the catalyst is supported.

3. The process of claim 1 where the reaction temperature is from about 360 to about 500° C.

4. The process of claim 1 where the molecular oxygen containing gas is employed in an amount sufficient to provide 2 to 50 times the amount of oxygen required to convert the 1,2,4,5- substituted benzene to pyromellitic acid.

5. The process of claim 1 where the space velocity of the reactants is from 1,000 to 100,000 hr.$^{-1}$.

6. The process of claim 1 where the 1,2,3,4-, 1,2,4,6-, substituted benzenes or mixture thereof comprises from 0.1 to 45 molar percent of the total 1,2,3,4-, 1,2,4,6 and 1,2,4,5- substituted benzenes present.

7. The process of claim 1 where the vanadium oxide is supported, and comprises 3 to 20 weight percent of the support.

8. The process of claim 7 where the vanadium oxide is present on the support with a second catalytic metal oxide, the vanadium oxide comprising 50 to 95 weight percent of the catalyst metal oxide plus vanadium oxide which is present.

9. The process of claim 8 where said second metal oxide is selected from the group consisting of oxides of Mo, Sn, Ag. Ce, W, Zn, Cd, Co and Ti.

10. The process of claim 9 where said second metal oxide is $MoO_3$.

11. The process of claim 9 where said second metal oxide is $SnO_2$.

12. The process of claim 1 where the catalyst consists essentially of $V_2O_5$ on an inert support.

13. The process of claim 1 where the catalyst consists essentially of $V_2O_5$ and a second catalytic metal oxide on an inert support.

14. The process of claim 1 where the 1,2,4,5-substituted benzene is selected from the group consisting of 1,5-dimethyl-2,4-dichloromethyl benzene, 1,4-dimethyl-2,5-dichloromethyl benzene and 1,2,4-trimethyl-5-monochloromethyl benzene.

15. The process of claim 1 where the 1,2,3,4-and 1,2,4,6- substituted benzenes are selected from the group consisting of 1, 4- dimethyl -2,3-dichloromethyl benzene, 1,2,4-trimethyl-3-monochloromethyl benzene and 1,2,4-trimethyl-6-monochloromethyl benzene.

16. The process of claim 1 where the 1,2,3,4- 1,2,4,6 and 1,2,4,5- substituted benzenes are monochloromethyl or dichloromethyl substituted, or mixtures thereof.

17. The process of claim 4 where:
the reaction temperature is 300 to 500° C.;
the space velocity of the reactants is 5,000 to 20,000 hr.$^{-1}$;
the 1,2,3,4-, 1,2,4,6-, or mixture thereof, substituted benzenes comprise from 0.1 to 45 molar percent of the total 1,2,3,4-, 1,2,4,6- and 1,2,4,5- substituted benzenes present.
the catalyst comprises $V_2O_5$ on an inert support, the $V_2O_5$ being 3 to 20 weight percent of the support;
the 1,2,4,5- substituted benzene is selected from the group consisting of 1,5-dimethyl-2,4-dichloromethyl benzene, 1,4-dimethyl-2,5-dichloromethyl benzene and 1,2,4-trimethyl-5-monochloromethyl benzene;
the 1,2,3,4- and 1,2,4,6- substituted benzenes are selected from the group consisting of 1,4-dimethyl-2,3-dichloromethyl benzene, 1,2,4 - trimethyl - 3-monochloromethyl benzene and 1,2,4-trimethyl-6-monochloromethyl benzene.

18. The process of claim 17 where the catalyst consists essentially of $V_2O_5$ on the inert support with a second catalytic metal oxide, the $V_2O_5$ comprising 50 to 95 weight percent of the second catalytic metal oxide plus $V_2O_5$ which is present and where the second catalytic metal oxide is selected from the group consisting of oxides of Mo, Sn, Ag, Ce, W, Zn, Cd, Co and Ti.

References Cited

UNITED STATES PATENTS

| 2,509,855 | 5/1950 | Beach | 260—524 |
| 2,773,921 | 12/1956 | Rylander et al. | 260—524 |

FOREIGN PATENTS

| 169,330 | 11/1951 | Austria | 260—523 |

OTHER REFERENCES

Migrdichian, Organic Synthesis, vol. II, 1957, pp. 1379–80.

LORRAINE A. WEINBERGER, Primary Examiner

R. D. KELLY, Assistant Examiner